(12) United States Patent
Chan et al.

(10) Patent No.: US 8,708,577 B2
(45) Date of Patent: Apr. 29, 2014

(54) SMALL FORM-FACTOR PLUGGABLE CONNECTOR SYSTEM

(75) Inventors: Victor J. Chan, San Diego, CA (US); Tyson Grant, San Marcos, CA (US)

(73) Assignee: E-Band Communications, LLC., San Diego, CA (US)

( * ) Notice: Subject to any disclaimer, the term of this patent is extended or adjusted under 35 U.S.C. 154(b) by 512 days.

(21) Appl. No.: 13/109,824

(22) Filed: May 17, 2011

(65) Prior Publication Data
US 2012/0020628 A1 Jan. 26, 2012

Related U.S. Application Data

(60) Provisional application No. 61/345,544, filed on May 17, 2010.

(51) Int. Cl.
*G02B 6/42* (2006.01)
(52) U.S. Cl.
CPC ............ *G02B 6/4261* (2013.01); *G02B 6/4284* (2013.01)
USPC .............................................. 385/88; 385/139
(58) Field of Classification Search
CPC ............................ G02B 6/4261; G02B 6/4284
See application file for complete search history.

(56) References Cited

U.S. PATENT DOCUMENTS

| 7,307,847 | B2* | 12/2007 | Torres et al. | ................... 361/730 |
| 7,314,384 | B2* | 1/2008 | Togami et al. | ................ 439/484 |
| 8,272,790 | B2* | 9/2012 | Belsan et al. | ................... 385/75 |
| 2006/0121769 | A1* | 6/2006 | Hanley et al. | ................. 439/372 |
| 2008/0248694 | A1* | 10/2008 | Togami et al. | ........... 439/620.05 |
| 2011/0206327 | A1* | 8/2011 | Chen | ............................... 385/88 |

* cited by examiner

*Primary Examiner* — Michelle R Connelly
(74) *Attorney, Agent, or Firm* — Mintz Levin Cohn Ferris Glovsky and Popeo, P.C.

(57) ABSTRACT

In an aspect there is provided a connector device. The connector device may include a cable connector having a housing having an opening at a first end and a cable gland at a second end; and a sleeve having an internal channel configured to interchangeably couple with an electrical transceiver module type and an optical transceiver module type. The internal channel may extend between a first end and a second end of the sleeve. The first end of the sleeve may be configured to insert through the opening in the housing to releasably couple the sleeve to the housing. The second end of the sleeve may be configured to insert through a port on a unit and couple the electrical transceiver to an edge connector on a printed circuit board (PCB) when the electrical transceiver is coupled with the sleeve. The second end of the sleeve may be further configured to insert through the port on the unit and couple the optical transceiver to the edge connector on the PCB when the optical transceiver is coupled with the sleeve. Related systems and methods are also described.

15 Claims, 10 Drawing Sheets

SMALL FORM-FACTOR PLUGGABLE CONNECTOR SYSTEM

CROSS REFERENCE TO RELATED APPLICATION

This application claims the benefit under 35 U.S.C. §119(e) of the following provisional application, all of which is incorporated herein by reference in its entirety: U.S. Ser. No. 61/345,544, entitled "Small Form Pluggable Connector System", filed on May 17, 2010.

FIELD

The present disclosure is generally related to small form-factor pluggable connector systems and, more particularly to rugged, weatherized and field-configurable connectors.

BACKGROUND

In outdoor wireless radio frequency (RF) and millimeter wave data communications links, a user may have the need to change the data interface type for the link. This can be accomplished by using a small form-factor pluggable (SFP) type of data interface module. These SFP modules are typically inserted into a metal cage that is mounted on a printed circuit board (PCB). An exposed board edge near the end of the SFP inserts into a mating connector attached to the PCB. A latch on the SFP locks into an opening in the metal cage to hold the assembly together. The data cable then connects to the other end of the SFP.

Typical connector systems that interface directly to the SFP make and break the connection at the data cable. Because of a significant length difference between fiber and electrical type SFPs, this method of connection may be difficult to realize if either type of SFP is considered. In addition, a connector method may need to be able to provide access to the SFP latch and clearance to remove and insert the SFP through the opening.

Typically, if a user needs to convert a system from an optical type of interface to electrical, or vice versa, the housing needs to opened, internal cables swapped out, SFP changed, and the system re-assembled. Often this is not practical in the field due to risk of damage to internal components.

SUMMARY

The subject matter disclosed herein provides a small form-factor pluggable connector system.

In one aspect, there is provided a connector device having a cable connector including a housing having an opening at a first end and a cable gland at a second end; and a sleeve having an internal channel configured to interchangeably couple with an electrical transceiver module type and an optical transceiver module type, the internal channel extending between a first end and a second end of the sleeve. The first end of the sleeve is configured to insert through the opening in the housing to releasably couple the sleeve to the housing, and the second end of the sleeve is configured to insert through a port on a unit and couple the electrical transceiver to an edge connector on a printed circuit board (PCB) when the electrical transceiver is coupled with the sleeve. The second end of the sleeve is further configured to insert through the port on the unit and couple the optical transceiver to the edge connector on the PCB when the optical transceiver is coupled with the sleeve.

The electrical transceiver can be a small form-factor pluggable (SFP) type transceiver or an XFP type transceiver. The optical transceiver can be a small form-factor pluggable (SFP) type transceiver or an XFP type transceiver. The device can interchangeably couple a mating board of the electrical transceiver or a mating board of the optical transceiver with the edge connector on the PCB in a tool-free manner. An inner surface of the housing can include a base near the first end corresponding to at least an outer surface of the sleeve creating a keyed interface with the sleeve. The sleeve can include a pair of rails configured to insert through corresponding channels in the base. The sleeve can include a reversible locking mechanism such that the sleeve locks into a coupling relationship with the housing. The reversible locking mechanism can include a pair of flexible prongs each having a flange extending from a distal end of the prong, wherein each prong temporarily flexes from a first position to a second position as the flange slides over a portion of the base. Each prong can passively relax back towards the first position as the flange inserts through a corresponding detent in the base. The second end of the sleeve can surround and protect at least a portion of the transceiver coupled with the channel. An inner surface of the port can include an insert corresponding to at least an outer surface of the sleeve creating a keyed interface with the sleeve.

In another aspect, there is provided a connector system including a cable connector having a housing having an opening at a first end and a cable gland at a second end; a sleeve having an internal channel configured to interchangeably couple with a first transceiver module and a second transceiver module, the internal channel extending between a first end and a second end of the sleeve, wherein the first end of the sleeve is configured to insert through the opening in the housing to releasably couple the sleeve to the housing; and an external port on a unit having an edge connector on a printed circuit board (PCB). The second end of the sleeve is configured to insert through the external port and couple the first transceiver module to the edge connector when the first transceiver module is coupled with the sleeve. The second end of the sleeve is further configured to insert through the external port and couple the second transceiver module to the edge connector when the second transceiver module is coupled with the sleeve.

The first transceiver module can be an electrical small form-factor pluggable (SFP) type transceiver or an XFP type transceiver and wherein the second transceiver module can be an optical small form-factor pluggable (SFP) type transceiver or an XFP type transceiver. The system can interchangeably couple a mating board of the first transceiver module or the second transceiver module with the edge connector on the PCB in a tool-free manner.

In another aspect, there is provided a method of coupling a transceiver connector system to a radio unit. The method includes inserting a first transceiver module type into an internal channel of a sleeve, wherein the sleeve is configured to interchangeably couple with the first transceiver module type and a second transceiver module type, the internal channel extending between a first end and a second end of the sleeve, wherein a mating board of the first transceiver module type is surrounded at least in part by the second end of the sleeve; inserting a cable through a cable gland at a first end of a cable connector into a housing of the cable connector and coupling the cable to the first transceiver module type; sliding the first end of the sleeve through an opening of the housing to releasably couple the first end of the sleeve to the housing; inserting the second end of the sleeve through an external port on the radio unit; and interfacing the mating board of the first transceiver module type with an edge connector on a PCB of the radio unit. The first transceiver module type includes an electrical transceiver module and the second transceiver module type includes an optical transceiver module.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DETAILED DESCRIPTION

Figure 1:
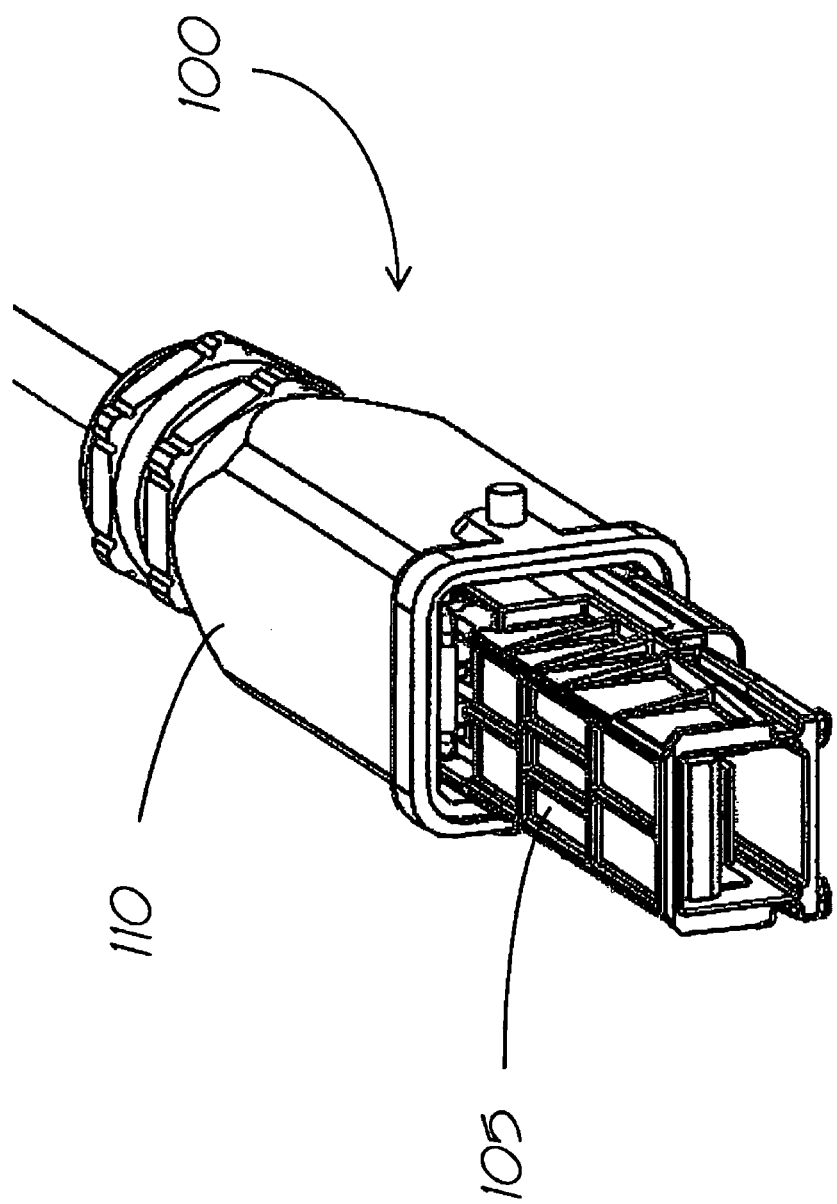
FIG. 1 depicts a perspective view of an implementation of an SFP connector system.
Figure 2:
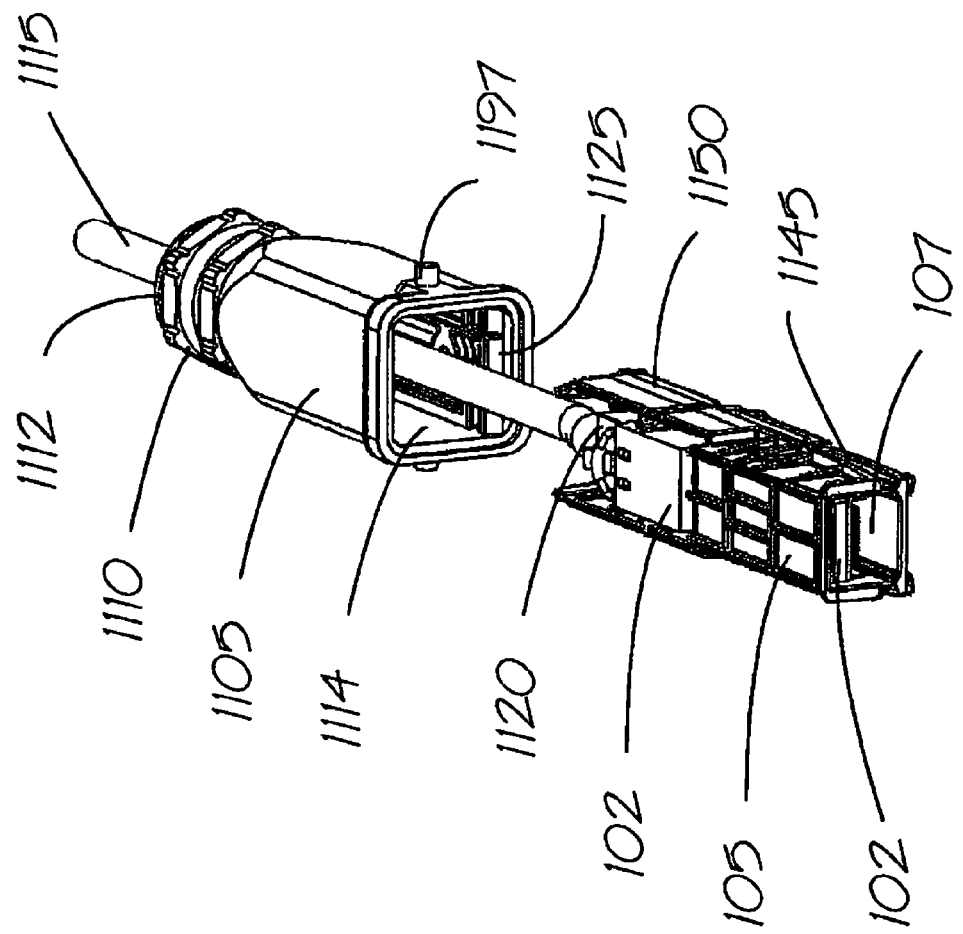
FIG. 2 depicts a partially exploded view of the connector system of FIG. 1.

FIG. 1 depicts a perspective view and FIG. 2 depicts a partially exploded view of an implementation of a connector system 100. The system 100 includes a sleeve 105 configured to couple with a cable connector 110 at a first end and a port 115 (not shown) at a second end. Generally, the system 100 provides guidance and weather sealing for a make and break interface between an existing board edge 107 of an SFP 102 housed within the system 100 and a standard card edge connector 103 mounted on a PCB 104.

SFPs are a type of hot-pluggable transceiver, converting between the electrical or fiber signals in a cable and a standard electrical interface in the respective equipment. SFPs are a physically smaller version of a GBIC (gigabit interface converter). SFPs can include a specific form factor that can handle up to 4.25 Gb/s transmission speeds. XFPs (sometimes referred to as SFP+) are SFP-sized transceivers that are capable of multi-gigabit transmissions (10 Gb is standard, but other options are available up to 100 Gb/s). XFPs are mechanically similar to SFPs and are considered herein. XFP and SFP are guided by multisource agreements. It should be appreciated where the term SFP is used that XFP and SFP+ type transceivers are also considered herein.

The system 100 can provide a rugged and IP67-rated sealed connection between the unit and the outside world. It should be appreciated that a variety of ratings can be achieved on the seals, including, but not limited to, IP 67. The system 100 can be configured for a variety of conditions including but not limited to water-proofing, dust-proofing, protective against corrosive environments (including acid rain, salt fog or other caustic chemistries), chemical resistance, electrical isolation, RF/EMI isolation, flammability/fire protection, thermal protection, safety, protection against plants and vermin, and mechanical strength. The system can be protected from UV radiation. A variety of materials including material used in many commercially available "outdoor" connector systems are not suited for use in outdoor telecom equipment due to a lack of UV resistance. Metals, or plastics specifically rated for UV resistance can be used in the systems described herein to ensure durability and regulatory compliance in outdoor applications. Materials selected for the components of the systems described herein can meet specific chemical resistance requirements including salt water, acidic environments, etc. The materials selected for the components of the systems described herein can electrically connect, or isolate, the system and specifically the SFP, from the outside environment. The systems described herein can be configured to provide RF/EMI isolation such as by using insert materials and seal materials that can be conductive, allowing the entire system to be grounded or tied to a reference voltage. The materials can also be static dissipative. The systems described herein can allow the SFP to share the environment of the unit (although it could be sealed into an independent environment). The components of the systems described herein can serve as a thermal barrier between the SFP environment and the outside environment. The systems described herein provide a comparatively strong mechanical system for protecting the SFP and the associated connections. The systems described herein protect the SFP from physical damage as well as inadvertent un-plugging. The systems described herein can be used in a variety of applications, including but not limited to outdoor telecom systems, communication equipment, industrial machinery, food and chemical process equipment, railway network systems, oil exploration, industrial process control, diagnostic equipment, factory automation, robotics and the like.

The system 100 can provide, in some implementations, a simple and cost effective mechanism for accommodating both electrical and optical types of SFPs interchangeably. Moreover, the system 100 can facilitate, in some implementations, changing of SFP type without opening the unit and exposing sensitive electronics to the environment, which can be particularly advantageous for outdoor and industrial type applications.

As best shown in FIG. 2, the cable connector 110 can include a housing 1105 and a cable gland 1110. In some implementations, the cable connector 110 can be a modified off-the-shelf type connector such as Harting HAN3A style connector, Amphenol (RJF EZ) and Molex (85720-5050 and 85730-5050) or similar connector. The cable connector 110 is configured to accept a cable 1115 such as an electrical or fiber optic cable. The cable 1115 can extend through a passage in the adapter nut 1112 at a proximal end region of the cable gland 1110 and into the housing 1105. The cable 1115 can interface with an SFP 102 housed within the sleeve 105 and inserted through an opening 1114 at a distal end region of the housing 1105. The cable 1115 can interface with the SFP 102 via a connector 1120. The connector 1120 can be an LC connector in the case of an optical SFP or an RJ45M connector in the case of a copper SFP.

Figure 3:
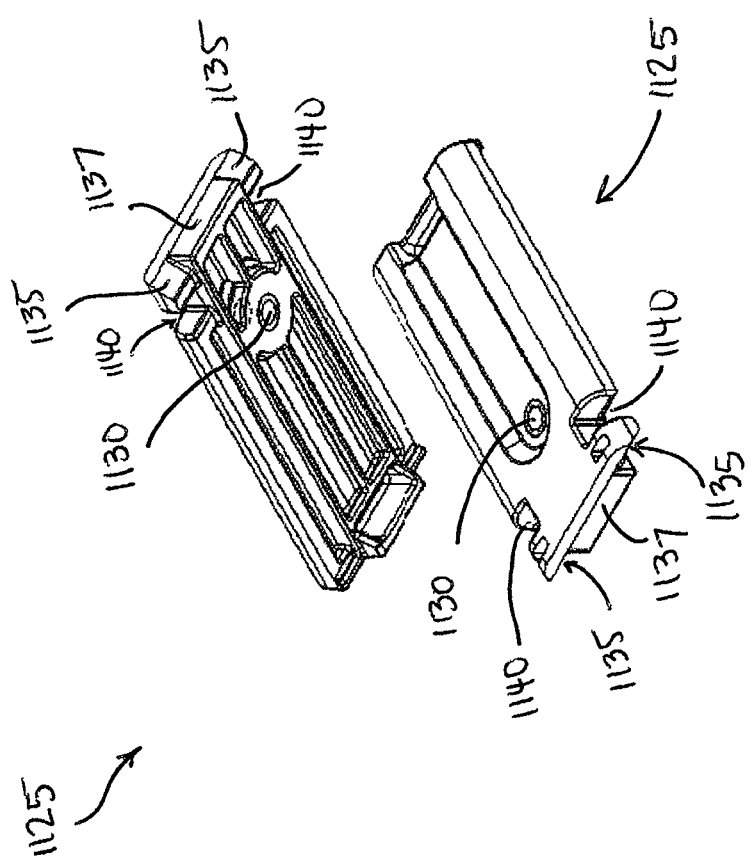
FIG. 3 depicts views of an implementation of a housing base.

As shown in FIGS. 2 and 3, the housing 1105 can include a housing base 1125 mounted on an internal surface. The housing base 1125 can be mounted using standard hardware such as a screw inserted through a screw hole 1130 or can be bonded or otherwise coupled to an internal surface of the housing 1105. The housing base 1125 can create a keyed interface for insertion of the sleeve 105 through the distal opening 1114 of the housing 1105. In one implementation, the keyed interface includes a pair of ramps 1135 adjacent a central element 1137 and aligned with corresponding detents 1140, as will be described in more detail below.

Figure 4:
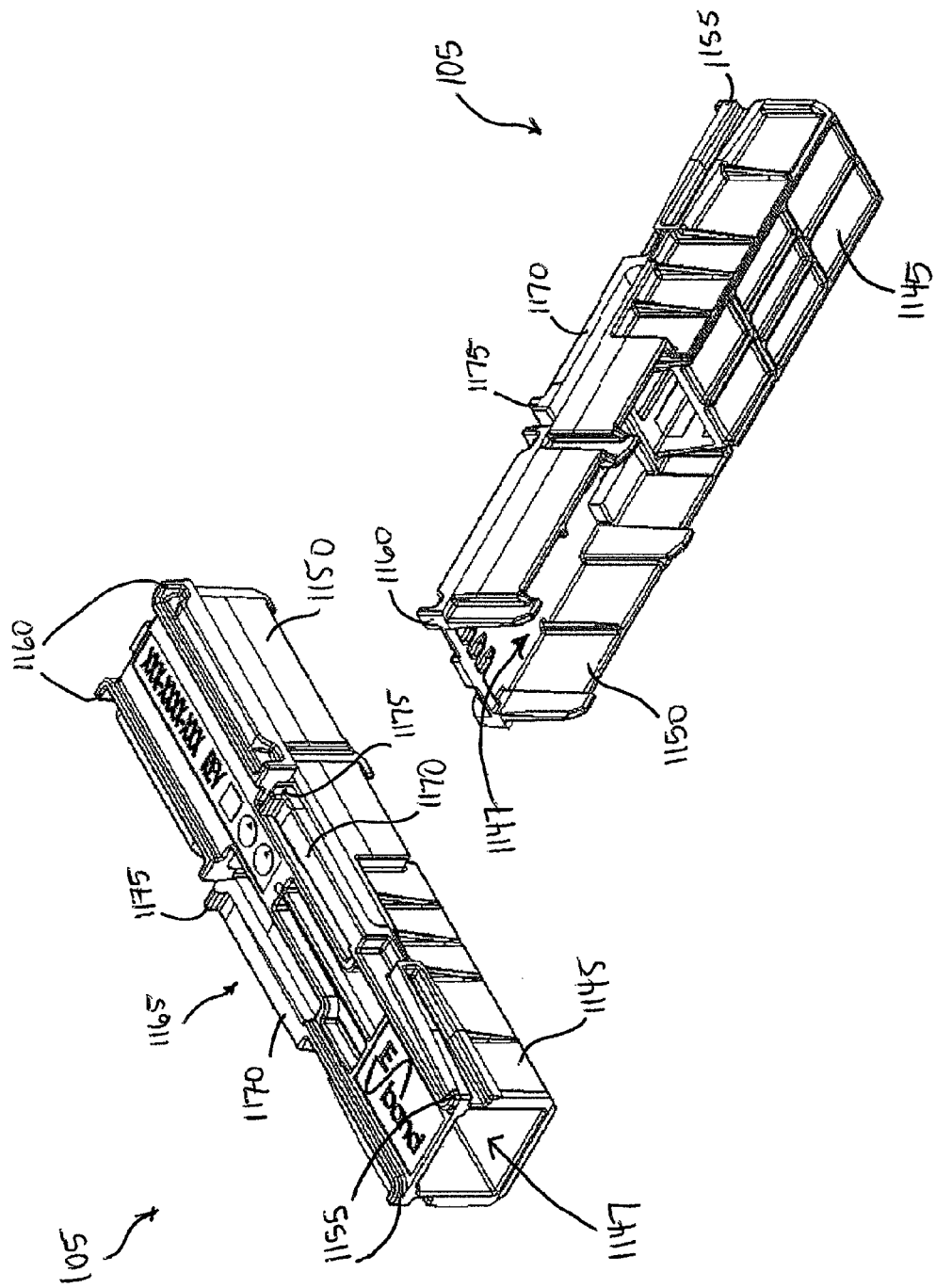
FIG. 4 depicts views of an implementation of a sleeve.
Figure 7:
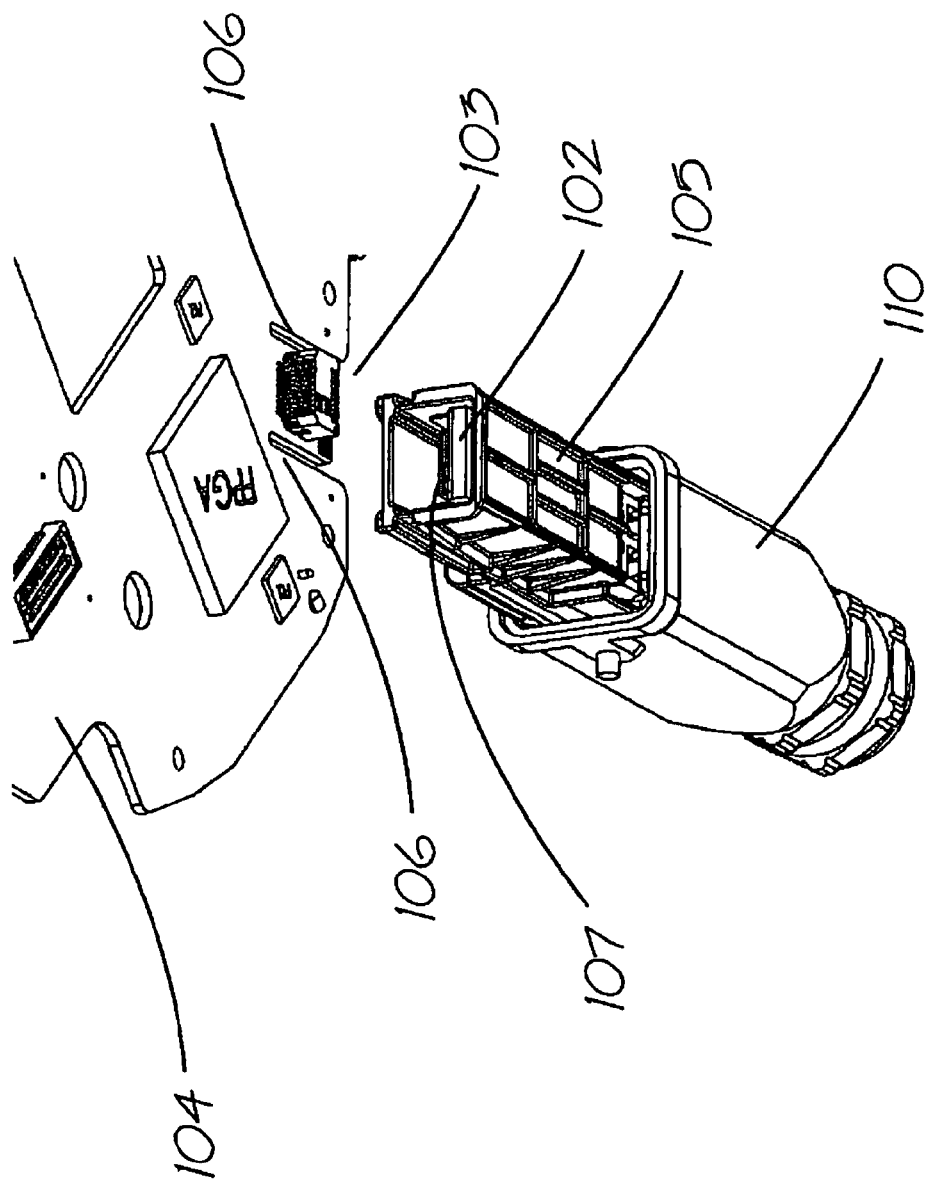
FIG. 7 depicts a perspective view of the connector system of FIG. 1 positioned for connection to a PCB.

As mentioned above, the sleeve 105 is configured to interchangeably couple with and house an SFP 102 for connection to the PCB (see FIG. 7). SFP transceiver modules whether copper or optical conform to the SFP Transceiver Multi-Source Agreement (MSA), which specifies, among other things, package dimensions for the port portions of the transceiver modules. The sleeve 105 can interchangeably couple with both copper and optical type SFPs. The sleeve 105 can include a shroud 1145 at a first end and a channel 1150 at a second, opposite end (see FIG. 4). The shroud 1145 can surround and protect at least a portion of the SFP inserted through a central opening 1147 extending through the sleeve 105 along its longitudinal axis. The shroud 1145 can include a lock mechanism (not shown) that interfaces with the latch (not shown) on the SFP in order to secure the SFP inside of the sleeve 105. The lock mechanism can lock the SFP inside the sleeve 105 as the SFP typically locks into a cage thus, the system 100 prevents the need for defeating existing latching methods for SFP-to-cage connections. The shroud 1145 has a length such that it can accommodate both an electrical SFP, which is generally longer, and an optical SFP, which is generally shorter.

It should be appreciated that use of the terms "distal" and "proximal" generally refer to locations on the system components relative to how a user would connect the system with a unit. Generally, "distal" refers to a location on a component that is closer to the unit or towards where the SFP would connect with the PCB. Generally, "proximal" refers to a location on a component that is further away from the unit or away from where the SFP would connect with the PCB. The terms are not intended to be limiting.

The shroud 1145 end of the sleeve 105 is configured to insert through the port 115 to guide and align the mating board 107 of the SFP 102 with the edge connector or slot 103 on the PCB 104 (see FIG. 7). The system 100 eliminates the need for a metal cage on the PCB for connection with the SFP. The distal end region of the shroud 1145 can include a pair of guide rails 1155 that interface with slots 106 on PCB 104 to ensure alignment between the mating board 107 and corresponding connector or slot 103. Other combinations of locating features, such as guide rails 1155 and slots 106 can be used to ensure alignment between the SFP mating board 107 and the corresponding connector or slot 103.

As mentioned above, the sleeve 105 also includes a channel 1150 located proximal to the shroud 1145. The channel 1150 is configured to couple to the housing 1105 of the cable connector 110 such that the connector 1120 can interface with the SFP 102 (see FIG. 2).

The channel 1150 can have a partially open configuration. The "open space" within the channel 1150 of the sleeve 105 and the housing 1105 of the cable connector 110 allows for the system 100 to accommodate for the differences in length between electrical and optical SFP types, which can minimize parts count and simplifies manufacturing. The longer electrical SFP can be accommodated as can the shorter optical SFP such that a single system 100 can be used for making the appropriate connections with the PCB for both module types in a tool-free manner. The system 100 provides flexibility in the field in that the type of data interface for the unit need not be determined at manufacturing. The system 100 is fully field-configurable, which reduces costs associated with stocking the various configurations, reworking units to change interface, and retesting after configuration changes are made.

At least one outer surface of the sleeve 105 can be keyed such that it prevents the sleeve 105 from being inserted through the opening 1114 of the housing 110 in any other orientation except the correct orientation. In one implementation, an outer surface of the sleeve 105 includes a pair of rails 1160. The leading edge of the rails 1160 can be inserted over the ramps 1135 of the housing base 1125 as the channel 1150 end of the sleeve 105 is inserted into the housing 1105 of the cable connector 110.

Again with respect to FIG. 4, the sleeve 105 can include a reversible locking mechanism 1165 such that the sleeve 105 can be locked into a coupling relationship with the housing 1105 of the cable connector 110. In one implementation, the locking mechanism 1165 can include a pair of flexible prongs 1170 each having a flange 1175 at their distal ends that extend outward from the prongs 1170 away from the body of the sleeve 105. The prongs 1170 and their respective flanges 1175 can be generally aligned with the rails 1160 on the outer surface of the sleeve 105. As the channel 1150 of the sleeve 105 is inserted through the opening 1114 and into the housing 1105 of the cable connector 110, the rails 1160 can slide past the ramps 1135 of the housing base 1125 whereas the flanges 1175 abut the ramps 1135. As the channel 1150 is further urged into the housing 1105, the prongs 1170 can temporarily flex from a first position to a second position towards the body of the sleeve 105 until the flanges 1175 slide over the corresponding ramps 1135 on the housing base 1125. Once the flanges 1175 pass beyond the ramps 1135, the prongs 1170 can passively relax as the flanges 1175 slide over and insert into the corresponding detents 1140 on the housing base 1125. Each prong 1170 can passively relax back towards the first position as the flange 1175 inserts through the corresponding detent 1140 in the base 1125. The locking mechanism 1165 can be reversible in that the flexible prongs 1170 can be urged by a user towards the body of the sleeve 105 until the flanges 1175 are removed from the detents 1140 and the sleeve 105 can be pulled away from the housing 1105.

Figure 5:
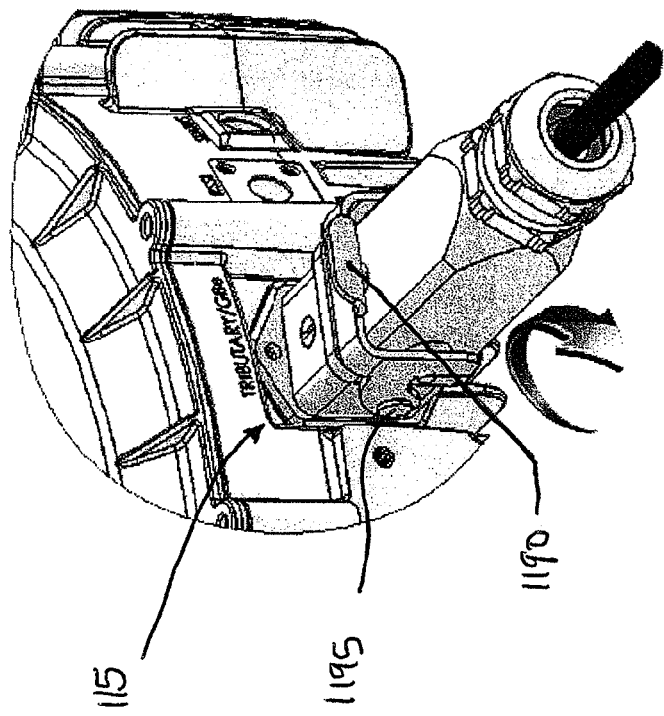
FIG. 5 depicts a perspective view of the connector system of FIG. 1 inserted through a port and connected to a unit.

In one implementation, the port 115 can be a TRIBUTARY/Gigabit Ethernet port (see FIG. 5). A management port (device administration) or combination port (where both management and tributary data are combined into a single connection, and then split out inside the radio using a switch) are also considered herein. The port 115 also can include network, 10/100, 100BASE-T, 1000BASE-X, 1000BASE-T, GbE, GigE, 10GE, 10GbE, 10 GigE, 10GBASE-T, 10GBASE-SR, 40GbE, and 100GbE ports or other connection/data rate standards that are supported by SFP and SFP+/XFP transceivers. Generally, the port 115 can be any network connection where an RJ45 or fiber (LC) connection is required or beneficial, regardless of actual data rate.

Figure 6:
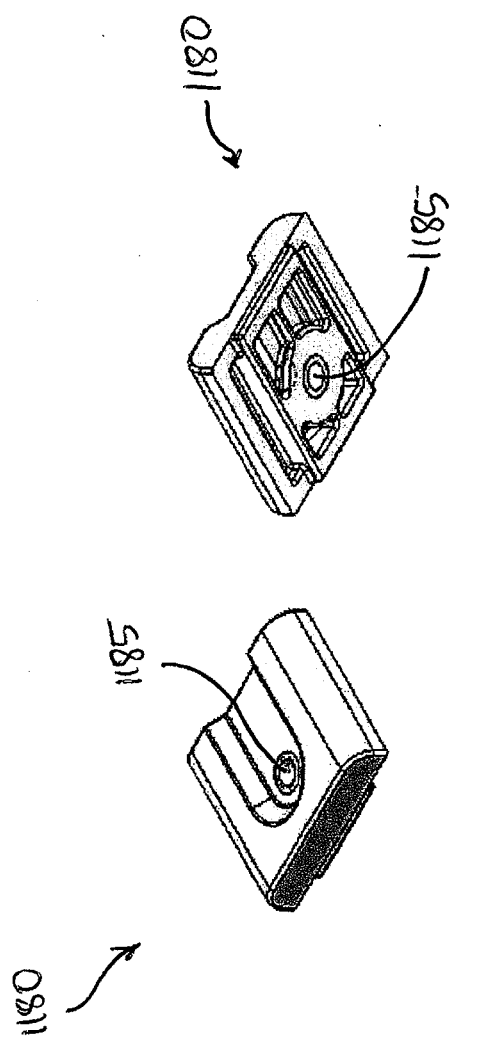
FIG. 6 depicts views of an implementation of a port insert.

The inner surface of the port 115 can correspond to at least an outer surface of the shroud 1145 to provide a keyed coupling between the two. The inner surface of the port 115 can include a port insert 1180 having a contour that corresponds to an outer surface of the shroud 1145 (see FIG. 6). This keyed connection of the shroud 1145 end of the sleeve 105 with the port insert 1180 prevents the sleeve 105 from being positioned within the port 115 in any orientation except the correct orientation. In one implementation, an outer surface of the shroud 1145 includes a pair of guide rails 1155 that corresponds to an inner surface of the port 115 (see FIG. 4). The port insert 1180 can be mounted within the port 115 using standard hardware such as a screw inserted through a screw hole 1185 or can be bonded or otherwise coupled to an internal surface of the port 115.

Again, with respect to FIG. 5, the port 115 can also include a latch 1190. The latch 1190 can pivot about a hinge 1195 or other mechanism such that it captures a corresponding feature 1197 on an outer surface of the housing 1105. The latch 1190 can help to maintain the connection between the system 100 and the port 115. The port 115 can also include a removable protective cap (not shown) that can be used for closing unconnected interfaces and protect the port 115 when not connected to a system 100. The cap can include a plastic tether or ball-chain to secure it to the port 115 whether or not it is in use. In another implementation of the design, the latch 1190 can be positioned on the housing 1105. In this implementation, the corresponding feature 1197 can be located the port 115. Other locking mechanisms can be employed to secure the housing 1105 to the port 115.

The systems described herein can allow a user to configure the data interface type of a unit within the field conveniently without opening the housing of the unit and exposing the internal components to the environment. The systems described herein move the connectivity external to the unit such that the unit is configurable between copper SFP and optical SFP within the field without risk of damage to delicate parts. The weather seal need not be broken and the unit need not be opened for repair, replacement and configurability. The unit can remain completely weatherproofed and rugged for outdoor or industrial use. Furthermore, the systems described herein can be assembled and connected to a unit in a completely tool-free manner.

Figure 8:
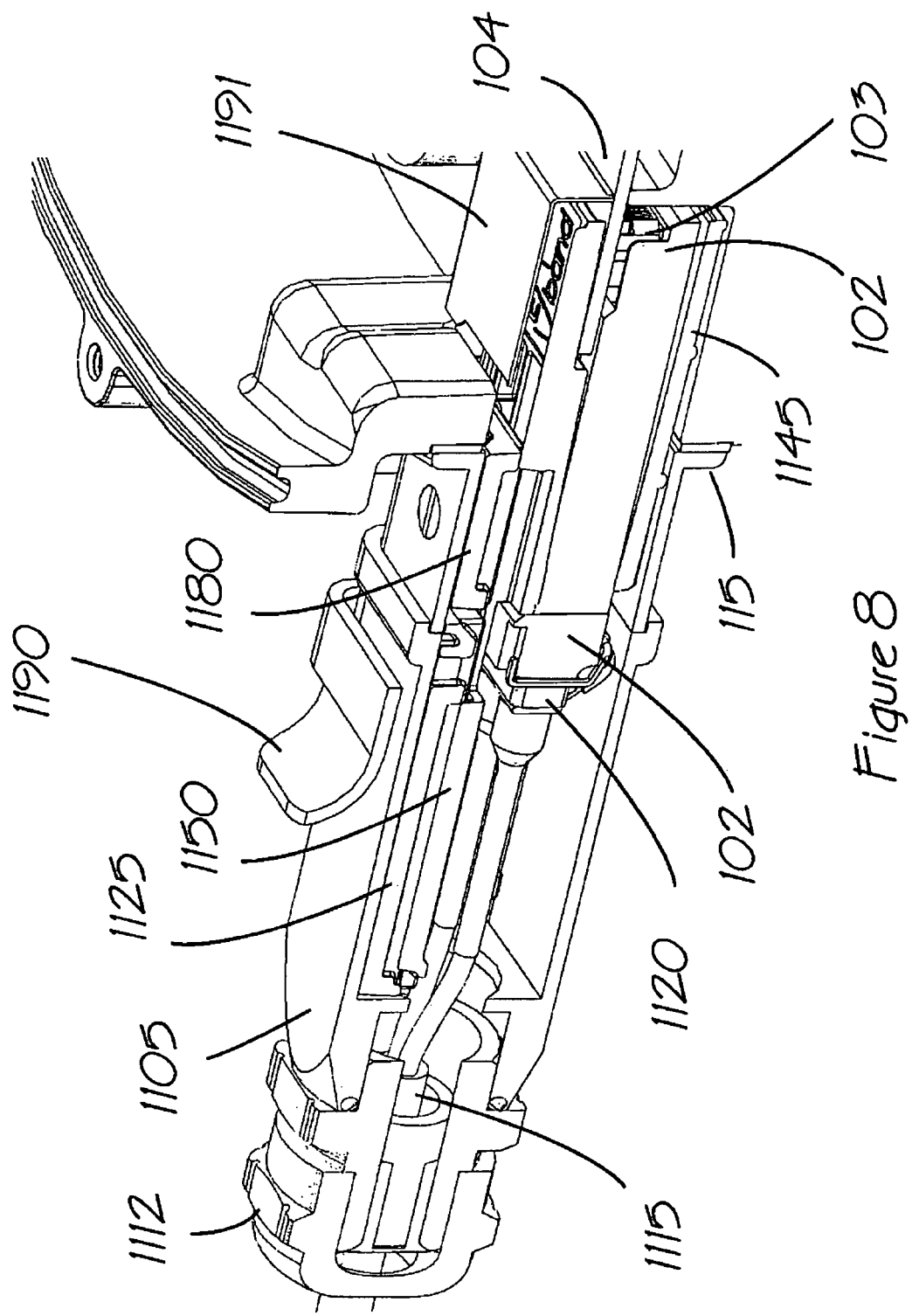
FIG. 8 depicts a cross-sectional view of the connector system of FIG. 1 inserted through a port and connected to a unit.
Figure 9:
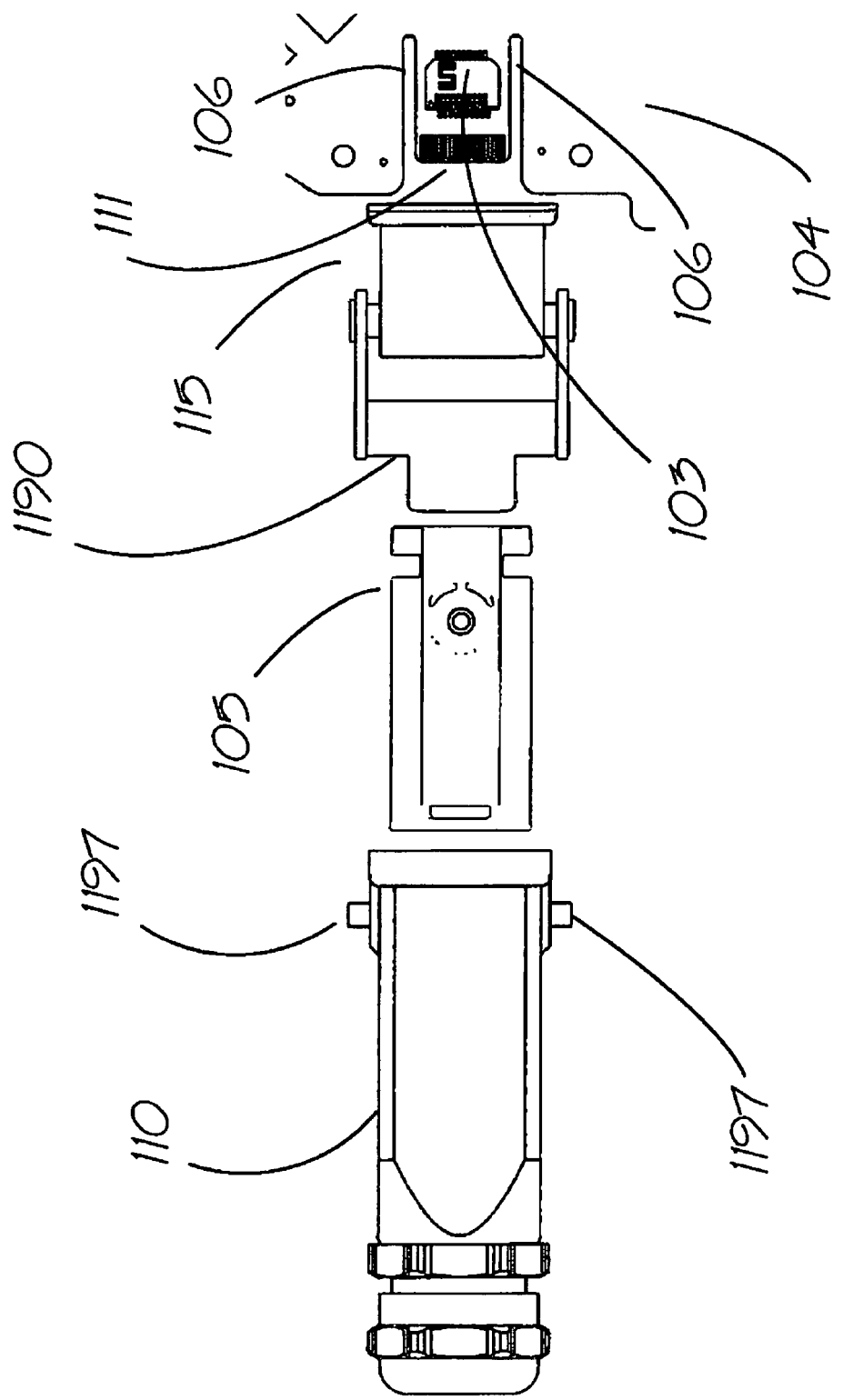
FIG. 9 depicts a top plan exploded view of an implementation of a connector system.
Figure 10:
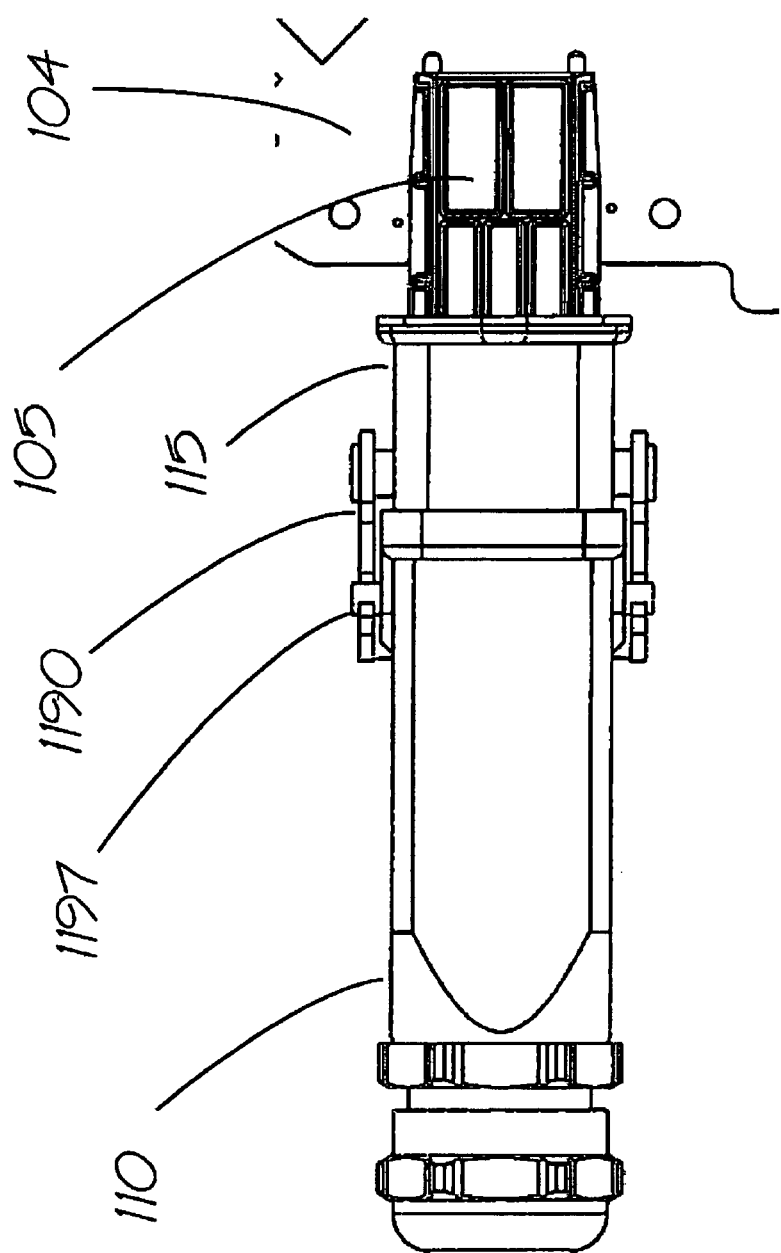
FIG. 10 depicts a top plan, assembled view of the connector system of FIG. 9.

FIG. 8 is a cross-sectional view of a coupling of the system 100 through a port 115 with an edge connector 103 of a unit. FIG. 9 is a top plan, exploded view and FIG. 10 is a top plan assembled view of the system 100, port 115 and edge connector 103 of a unit. The unit can be a point-to-point radio system, such as a system that allows gigabyte Ethernet traffic to be wirelessly exchanged between radios.

With respect to FIG. 8, the SFP 102 can be inserted into the central opening 1147 of the sleeve 105 from within the channel 1150 such that the mating board 107 of the SFP 102 extends through the shroud 1145 towards a distal end of the sleeve 105. The latch of the SFP 102 can be engaged such that the SFP 102 and the sleeve 105 are in locked engagement with one another. The channel 1150 end of the sleeve 105 can be inserted through the opening 1114 at the distal end region of the housing 1105 until the sleeve 105 is in locked coupling with the cable connector 110 via a lock mechanism 1165. The channel 1150 can be oriented such that the leading edge of the rails 1160 is inserted over the ramps 1135 of the housing base 1125 and the flanges 1175 of the flexible prongs 1170 snap into their respective detents 1140 on the housing base 1125.

A cable 1115 can extend through the adapter nut 1112 of the cable gland 1110 and into the housing 1105 such that the connector 1120 is available to interface with a proximal end of the SFP 102. A user can manually pull through the housing 1105 the cable 1115 and connect the cable 1115 to the SFP prior to insertion into the housing 1105.

Once the system 100 is assembled, it can be inserted through the port 115 of the unit. A protective cap, if present, can be removed from the port 115 and the latch 1190 rotated to a fully open position. The shroud 1145 housing the SFP 102 can be inserted through the port 115 such that the guide rails 1155 on a surface of the shroud 1145 can align with the contours of the port insert 1180. The shroud 1145 can surround the SFP 102 on at least four sides such that the mating board 107 is accessible through a distal end of the central channel 1147 and the sidewalls of the shroud 1145 can insert through slots 106 of the PCB 104. The sidewalls of the shroud 1145 reach the end of the slots 106 such that the mating board 107 properly aligns with the edge connector 103 on PCB 104 and the system 100 is fully inserted through the port 115 and sealed from the environment. The latch 1190 can rotate around its axis until it is positioned down over at least a portion of the housing 1105. The port 115 can include a small board-mounted shield 1191 that prevents a user from probing inside the equipment when the system 100 is not connected. This protects the unit from an object being inserted through the opening and damaging the unit. In other implementations, this can be a safety feature protecting the user from and preventing electrical shock.

The systems described herein can be designed to incorporate additional electrical connections, supplementing the SFP. For example, a user may want to incorporate both an SFP connection and independent power connections within the confines of a single connector. The port 115 can include inserts that can be designed to include the additional connections, allowing for a single system 100 to make a hybrid connection including both the SFP and the additional signal/power connections.

The components of the system 100 can be formed of a variety of materials depending on the industry for which the system 100 is used. Generally, the components can be metal or plastic. In one implementation, the sleeve 105 can include a plastic material having a metal filler such that the sleeve 105 is conductive or static dissipative. The materials can be UV resilient, flammability resistant, and compliant with the RoHS directive. The materials can be selected that include coatings and/or seal materials that can be important for a particular application. For example, some systems include an epoxy-based powder coat paint for maximum outdoor durability. In addition, the seals can be silicone seals that are well suited for specific telecommunications industry and/or outdoor use. Alternatively, the seals can be suitable for industries that are silicon sensitive.

In an additional implementation, the size of the opening in the housing side connector is exploited to allow creation of an external interface board. This interface board may be used as a programming/configuration tool, diagnostic tool, serial interface, etc. and may not be intended to be a permanent part of the radio unit. The interface board can pass through the opening in the housing side of the connector and connect to printed contacts 111 on the edge of the internal board (see FIG. 9). These printed contacts 111 can be used in conjunction with the system 100 described herein. The housing side of the connector system can serve as a keyed guide for the system 100 as well as a port to allow the external interface board to be connected.

The foregoing description is intended to illustrate but not to limit the scope of the invention, which is defined by the scope of the appended claims. Other embodiments are within the scope of the following claims.

What is claimed:

1. A connector device, comprising:
   a cable connector comprising a housing having an opening at a first end and a cable gland at a second end; and
   a sleeve comprising an internal channel configured to interchangeably couple with an electrical transceiver module type and an optical transceiver module type, the internal channel extending between a first end and a second end of the sleeve,
   wherein the first end of the sleeve is configured to insert through the opening in the housing to releasably couple the sleeve to the housing, and wherein the second end of the sleeve is configured to insert through a port on a unit and couple the electrical transceiver to an edge connector on a printed circuit board (PCB) when the electrical transceiver is coupled with the sleeve, and wherein the second end of the sleeve is further configured to insert through the port on the unit and couple the optical transceiver to the edge connector on the PCB when the optical transceiver is coupled with the sleeve.

2. The device of claim 1, wherein the electrical transceiver is a small form-factor pluggable (SFP) type transceiver or an XFP type transceiver.

3. The device of claim 1, wherein the optical transceiver is a small form-factor pluggable (SFP) type transceiver or an XFP type transceiver.

4. The device of claim 1, wherein device interchangeably couples a mating board of the electrical transceiver or a mating board of the optical transceiver with the edge connector on the PCB in a tool-free manner.

5. The device of claim 1, wherein an inner surface of the housing comprises a base near the first end corresponding to at least an outer surface of the sleeve creating a keyed interface with the sleeve.

6. The device of claim 5, wherein the sleeve comprises a pair of rails configured to insert through corresponding channels in the base.

7. The device of claim 5, wherein the sleeve comprises a reversible locking mechanism such that the sleeve locks into a coupling relationship with the housing.

8. The device of claim 7, wherein the reversible locking mechanism comprises a pair of flexible prongs each having a flange extending from a distal end of the prong, wherein each prong temporarily flexes from a first position to a second position as the flange slides over a portion of the base.

9. The device of claim 8, wherein each prong passively relaxes back towards the first position as the flange inserts through a corresponding detent in the base.

10. The device of claim 1, wherein the second end of the sleeve surrounds and protects at least a portion of the transceiver coupled with the channel.

11. The device of claim 1, wherein an inner surface of the port comprises an insert corresponding to at least an outer surface of the sleeve creating a keyed interface with the sleeve.

12. A connector system, comprising:
    a cable connector comprising a housing having an opening at a first end and a cable gland at a second end;
    a sleeve comprising an internal channel configured to interchangeably couple with a first transceiver module and a second transceiver module, the internal channel extending between a first end and a second end of the sleeve, wherein the first end of the sleeve is configured to insert through the opening in the housing to releasably couple the sleeve to the housing; and
    an external port on a unit comprising an edge connector on a printed circuit board (PCB),
    wherein the second end of the sleeve is configured to insert through the external port and couple the first transceiver module to the edge connector when the first transceiver module is coupled with the sleeve, and
    wherein the second end of the sleeve is further configured to insert through the external port and couple the second transceiver module to the edge connector when the second transceiver module is coupled with the sleeve.

13. The system of claim 12, wherein the first transceiver module is an electrical small form-factor pluggable (SFP) type transceiver or an XFP type transceiver, and wherein the second transceiver module is an optical small form-factor pluggable (SFP) type transceiver or an XFP type transceiver.

14. The system of claim 12, wherein the system interchangeably couples a mating board of the first transceiver module or the second transceiver module with the edge connector on the PCB in a tool-free manner.

15. A method of coupling a transceiver connector system to a radio unit, comprising:
    inserting a first transceiver module type into an internal channel of a sleeve, wherein the sleeve is configured to interchangeably couple with the first transceiver module type and a second transceiver module type, the internal channel extending between a first end and a second end of the sleeve, wherein a mating board of the first transceiver module type is surrounded at least in part by the second end of the sleeve;
    inserting a cable through a cable gland at a first end of a cable connector into a housing of the cable connector and coupling the cable to the first transceiver module type;
    sliding the first end of the sleeve through an opening of the housing to releasably couple the first end of the sleeve to the housing;
    inserting the second end of the sleeve through an external port on the radio unit; and
    interfacing the mating board of the first transceiver module type with an edge connector on a PCB of the radio unit,
    wherein the first transceiver module type comprises an electrical transceiver module and the second transceiver module type comprises an optical transceiver module.

* * * * *